Patented June 18, 1946

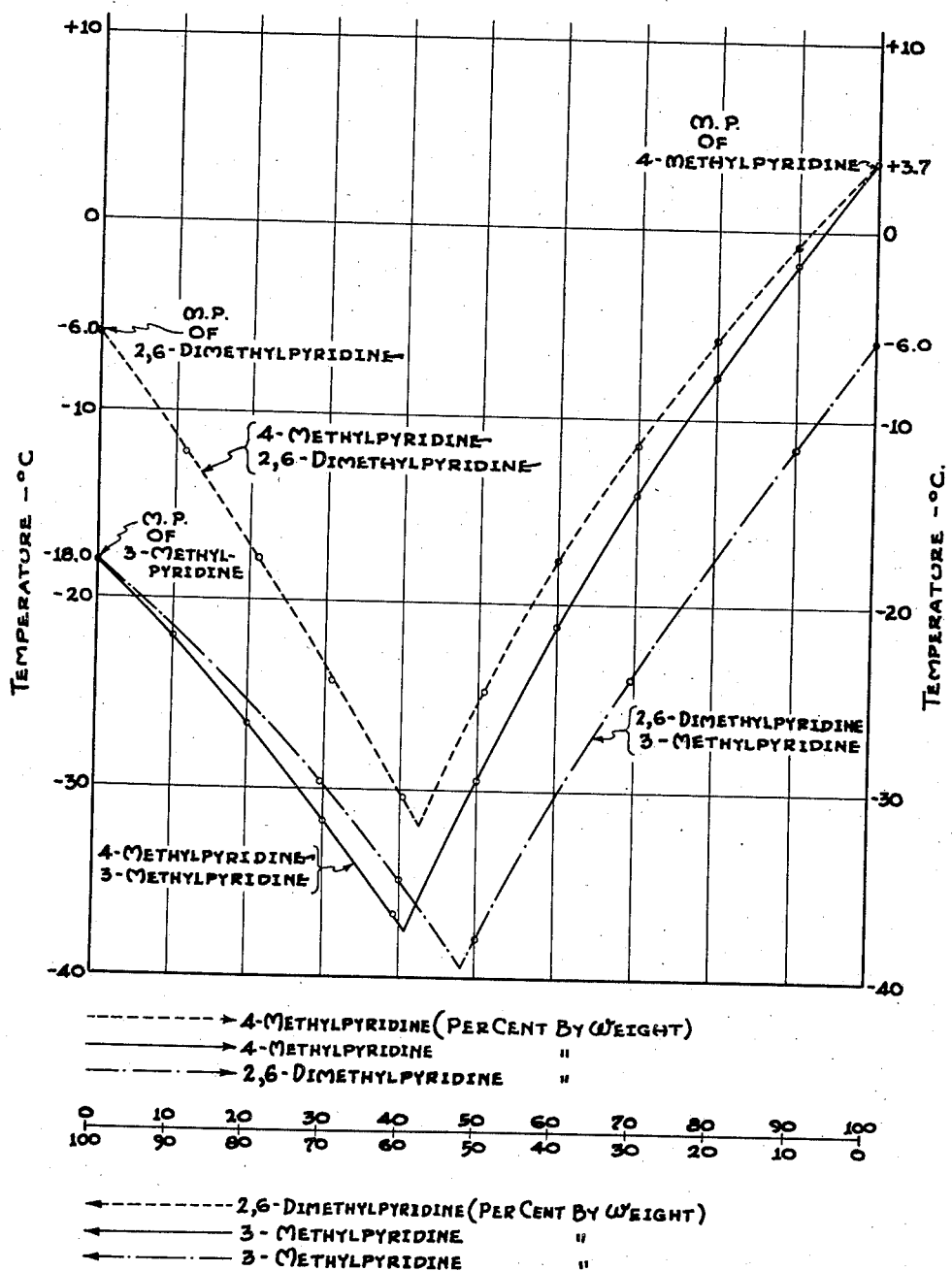

2,402,158

UNITED STATES PATENT OFFICE 2,402,158

SEPARATION OF HOMOLOGUES OF PYRIDINE

William Ludomier Glowacki, Pittsburgh, and Charles Francis Winans, Beaver, Pa., assignors, by mesne assignments, to Koppers Company, Inc., a corporation of Delaware Application July 15, 1943, Serial No. 494,840

10 Claims. (Cl. 260—290)

The present invention relates to the separation of homologues of pyridine which have heretofore been considered inseparable by mere physical means; it contemplates more especially the recovery of pure 2,6-dimethylpyridine, 4-methylpyridine, and 3-methylpyridine from mixtures containing two and even three of said compounds which are commonly referred to respectively as alpha,alpha'-lutidine, gamma-picoline, and beta-picoline.

In the refining by distillation of those crude mixtures of pyridine homologues recovered, for example, from coal tar, from ammonia saturators, or from petroleum-derived nitrogenous bases, there is easily separable a fraction that boils predominantly between about 141–144° C. This fraction is a concentrate of such of the three said homologues of pyridine as are present in the original said crude mixture. 3-methylpyridine, 4-methylpyridine, and 2,6-dimethylpyridine have boiling points respectively of 143.5°, 144.2°, and 142.8° C.; in consequence of their close boiling points their mixtures are not separable by ordinary methods of distillation into pure chemical entities, and although complicated chemical procedures are known whereby certain of the compounds of their mixtures can be isolated in a high degree of purity, such procedures in some instances involve complete alteration of the chemical nature of one or more of the associated compounds and from such altered compounds the original homologues are recoverable only with difficulty, if at all.

An object of the present invention is to provide novel, practical improvements whereby without substantial alteration of their chemical nature and by purely physical means, more especially, 3-methylpyridine, 4-methylpyridine, and 2,6-dimethylpyridine can be individually isolated, from their binary or ternary mixtures, in substantially pure form.

A further object of invention is to provide novel method and means whereby mixtures of said homologues of pyridine can be directly, rapidly, and cheaply separated into substantial fractions having important enrichments of said homologues.

The invention has for further objects such other improvements and such other operative advantages or results as may be found to obtain in the processes or apparatus hereinafter described or claimed.

There is no process known up to the present whereby close-boiling homologues of pyridine can be resolved by purely physical method into a fraction, or fractions, having any of said homologues in any importantly greater enrichment than they are present in their original mixtures. Few, if any, of the true melting points of such compounds have even been accurately determined.

The present inventors have now discovered that mixtures of pyridine homologues form practically ideal solutions without the formation of solid solutions and that if, for example, the initial temperature at which a mixture of 2,6-dimethylpyridine, 4-methylpyridine, and 3-methylpyridine shows crystal formation is above about −50° C., there is separable from the mother liquor a product in which at least one of said components is in importantly higher concentration than it is present in the original mixture. If, however, no crystalline phase appears in any such mixture above about the temperature of −50° C., the production of any substantially enriched fractions is practically impossible. In other words, the ternary eutectic of 2,6-dimethylpyridine, 4-methylpyridine, and 3-methylpyridine is reached at about the stated temperature and the ternary eutectic mixture is 35%, 27%, and 38% by weight of, respectively, 2,6-dimethylpyridine, 4-methylpyridine, and 3-methylpyridine.

In accordance with the present invention therefore normally liquid mixtures of close-boiling homologues of pyridine having crystallization points above about −50° C. are chilled to a preferred temperature thereabove at which the formed crystalline slurry is conveniently separable by filtration, centrifugalization, or the like, from the associated mother liquor; the crystalline phase is then separated from said mother liquor by any preferred means. The so-separated mother liquor can then be rechilled to a still lower temperature, but above −50° C., and the formed crystals separated from this second mother liquor. This process step can be repeated as many times as analysis of either the mother liquor or the recovered crystals shows that enrichment of a preferred component therein is being effected. The separated crystalline phases can also be remelted and be again chilled to a low temperature to form a new crop of crystals which will appear in this new mother liquor at a higher temperature than crystals appeared in their immediately preceding mother liquor and will contain at least one of said homologues of pyridine in increased higher enrichment than it was present in the prior crystal phase or in the original mixture. Depending upon the composition of the starting material, components in high enrichment can ultimately be either easily or tediously produced in the recovered crystalline phases by repeated low-temperature recrystallizations, as is evident from the hereinafter-given specific Example No. 1.

Although the present process provides the above novel method for separating enriched fractions from ternary mixtures of close-boiling pyridine homologues, it is also operative and it is preferred, because of greater ease in arriving at pure constituents, to perform its features on essentially binary mixtures that can be easily prepared from such ternary mixtures for example by the process steps described by Charles F. Winans in his copending application, Serial No. 494,841, filed of even date, and wherein he sets forth a method of simple preparation of such binary mixtures, without destruction or drastic alteration of the chemical nature of the constituent components of the starting material; all the components of their original mixtures are thus completely recoverable in fractions of increased concentration of specific components. According to this said copending application ternary mixtures of close-boiling homologues of pyridine are easily resolved into either binary mixtures or compounds of relatively high purity by simple treatment of the ternary mixtures with combining acids under conditions adapted selectively to form a salt, or salts, with one or two of the components of said mixtures, the new binary mixtures being easily recoverable either from the mother liquors of such acidic treatments or from the formed salts themselves. Other chemical methods are known for converting a given ternary mixture of pyridine homologues into another such mixture having an importantly reduced proportion of at least one of the components and also for converting a ternary mixture into a binary mixture; for example, by recrystallizations of the compounds formed between said homologues and certain metallic halides and also by preferential reaction of some of the homologues with such compounds as urea and aldehydes.

According to the invention these binary mixtures are also subjected to fractional crystallization at temperatures above about −50° C., and components of high purity are in simple manner separated from the crystalline phase.

It is also within the scope of the invention to carry out the low-temperature crystallizations, or any recrystallizations of fractions, in a plurality of such steps, so that the resultant crystalline slurry produced during any one crystallization step does not become too thick for effective separation from the mother liquid. Added neutral solvents such as benzene, toluene, alcohol, and the like, can also be employed to dilute the crystallized homologues thereby to overcome production of crystalline slurries that are too thick for good separation of mother liquor at a chosen temperature of crystallization. In the latter instance, the temperature required for a given separation of crystalline produce will be proportionately lowered. The employed neutral solvent is preferably of such relative boiling point that it is easily separable from the mother liquor and the separated crystal phases, by fractional distillation.

It is also advantageous to carry out the crystallizations and the separation of crystalline phases from the mother liquor in an atmosphere of low humidity, or even an anhydrous one, to prevent the condensation of water vapor on or in the products because they readily take up water in which they are easily soluble; the melting points of especially the crystalline products are importantly altered by its presence. This anhydrous condition is conveniently provided by flowing a dry inert gas over the reaction mixture and the products while performing the process steps. When determining the melting points of the crystalline products for their purity it should be certain that they are in anhydrous form; they can be thus simply prepared in an appropriate fractional distillation step because of the lower boiling point of water.

The crystallizations can be performed to advantage in the practice in well-insulated or double-walled apparatus equipped with a stirring device. Thermocouples are appropriate for making temperature measurements.

In the accompanying single sheet of drawings forming a part of this specification, there is shown phase diagrams of certain binary mixtures that were determined by the practice of the present invention and which serve as an index or guide for the invention's future performance to realize, easily and quickly, the stated objects with optimum results.

The following specific examples are illustrative of the results that are obtainable by the practice of the instant improvement but are not indicative of its scope or limitations:

*Example No. 1*

A so-called 3° normally liquid tar-base mixture, that was anhydrous and boiled predominantly between 141°–144° C. and contained about 34% of 2,6-dimethylpyridine, 38% of 4-methylpyridine, and 27.5% of 3-methylpyridine, was chilled in a well-insulated reaction-vessel to well below 0° C. At −25° C. a crystal phase began to separate from the agitated mixture. Crystallization was allowed to proceed until a reasonably viscous slurry was formed. Thereafter, the so-formed slurry was separated into a crystal phase and mother liquor by introduction of the slurry into an operating centrifuge the stainless steel basket of which had been previously chilled to a low temperature by contact with solid carbon dioxide. 28.6% by weight of the so-treated mixture was separated as a crystal mass that had the following composition, by weight, of 5% 3-methylpyridine, 57% 4-methylpyridine, and 38% 2,6-dimethylpyridine. The so-separated crystals were melted and again crystallized at a temperature of −28° C., with separation of the mother liquor from the crystalline phase, as above described. Upon melting and analysis this second crop of crystals showed it to contain respectively, by weight, 1% 3-methylpyridine, 81.8% 4-methylpyridine, and 17% 2,6-dimethylpyridine.

An effective enrichment of 4-methylpyridine in the crystal phase had thus been effected, whereas the mother liquor had an enriched content of 3-methylpyridine. The yield of the former was about 10% of the starting material.

Continued recrystallizations of recovered crystal phases leads to products of increasingly enriched refinement and eventual purity. In the case of the ternary mixtures of pyridine homologues the number of recrystallizations that is required to prepare a product of a preferred enrichment or purity can, depending on the composition of the starting material, require an economically prohibitive number of recrystallizations. The present inventors have now determined that: if such ternary mixtures of pyridine homologues are first reduced, for example, by process features set forth in the above-mentioned copending application of one of the present co-inventors, to binary mixtures or to other ternary mixtures wherein the content of a single component is sharply reduced from that obtaining in the initial mixture, importantly higher yields of product having a preferred enrichment are recoverable in a lesser number of crystallization steps; an equivalent yield of product can be obtained at less sharply reduced temperatures; and even the pure components can be easily, economically, and quickly prepared.

All this will be better understood by reference to the accompanying drawing wherein the phase diagrams of the three possible binary mixtures of the compounds 2,6-dimethylpyridine, 4-methylpyridine, and 3-methylpyridine are given as determined by the inventors from the pure compounds prepared according to the present invention. Referring to the drawing: if, for example, the starting material is a binary mixture of 80% and 20%, by weight, respectively, of 2,6-dimethylpyridine and 4-methylpyridine that is to be processed for further enrichment, or for the preparation of the former said compound in pure form, it is apparent from the uppermost phase diagram of the drawing (the dotted line) that if said mixture is carefully chilled to about $-31.8°$ C., the eutectic temperature of said binary mixture, as much as 53% by weight of said starting material can be easily recovered as substantially pure 2,6-dimethylpyridine in the crystal phase precipitated by said chilling. The mother liquor, containing about 42.5% by weight of 4-methylpyridine and 57.5% by weight of 2,6-dimethylpyridine, can then be treated with a limited amount of acid according to the procedure of the copending Winans application, Serial No. 494,841, for further recovery of the latter said compound and thereby converting the eutectic mixture of the mother liquor into one highly enriched in 4-methylpyridine which can thereafter be effectively retreated at low temperature for recovery of the latter compound in still more highly enriched or even in pure form, as the precipitated crystal phase.

If the starting material is a binary mixture, for example, of about 26% and 74% by weight, of respectively 4-methylpyridine and 3-methylpyridine that is to be processed, according to the invention, for further enrichment, or preparation of, the latter said compound in pure form, it is also apparent from the middle phase diagram of the drawing (the continuous line) that if said mixture is carefully chilled to about $-37.4°$ C., the eutectic temperature of such binary mixture, as much as about 36.5% by weight of said starting material can be easily recovered as substantially pure 3-methylpyridine in the crystal phase precipitated by said chilling. The mother liquor, containing about 41% by weight of 4-methylpyridine and 59% by weight of 3-methylpyridine can then be treated, as hereinabove indicated, with a limited amount of acid, and the former said compound be thereby selectively removed from the eutectic mother liquor, thereby producing a fraction re-enriched in its content of 3-methylpyridine which can be again crystallized at a low temperature for the recovery of additional latter said compound.

If, on the other hand, the starting material contains no 4-methylpyridine and is a binary mixture of, for example, about 70% and 30%, by weight, of respectively 2,6-dimethylpyridine and 3-methylpyridine, reference to the lower phase diagram of the drawing (the dot-and-dash line) shows that if said starting material is carefully chilled to about $-39.4°$ C., as much as 42.3% by weight of said starting material can be easily recovered as substantially pure 2,6-dimethylpyridine in the crystalline phase precipitated by said chilling. The mother liquor can then be treated with a limited amount of acid for the selective removal of most of its remaining 2,6-dimethylpyridine to give a product very high in 3-methylpyridine which can then be crystallized at low temperature in accordance with its composition and conditions indicated by the upward-extending left-hand portion of the dot-and-dash phase diagram of the drawing, for recovery of enriched, or pure, 3-methylpyridine.

All the above said binary starting materials are easily prepared from, for example, the ternary mixture employed as the starting material in the above Example No. 1, either by its stepwise treatment with mole fractions of the total quantity of a salt-forming acid that is required to form salts with all the homologues in a given amount of the starting material, or by combining pyridine homologues, or their salts, or both, of fractions prepared by such stepwise treatment with acid.

The following specific examples are illustrative of the results that have been obtained in the practice by treatment of the above binary mixtures of pyridine homologues according to the invention.

*Example No. 2*

A binary mixture of pyridine homologues containing about 13% and 87%, by weight, respectively of 4-methylpyridine and 2,6-dimethylpyridine were subjected to low-temperature crystallization in the following manner and with the stated results.

A sample of the above binary mixture was chilled in three steps with separation of the crystalline phase and the remaining mother liquor after each such step in a precooled centrifuge. The lowest temperature reached was $-29.5°$ C. From 690 parts of the original binary mixture, there was recovered about 60% by weight of a product enriched in 2,6-dimethylpyridine which after dehydration, by distillation to remove moisture that condensed into and was absorbed by said product during processing, had a melting point of $-9°$ C. Similar recrystallization of this product gave a total yield of 30% of pure 2,6-dimethylpyridine having a constant freezing point of $-6.3°$ C., and a mother liquor with a freezing point of $-7.3°$ C. which was thus a highly concentrated mixture of said compound with a very minor content of 4-methylpyridine.

*Example No. 3*

A binary mixture containing about 20% of 4-methylpyridine and 80% of 3-methylpyridine was reduced in temperature to about $-38°$ C. until about 26% by weight of the starting mixture was separable from the mother liquor on centrifugalization of the so-formed slurry. The melting point of the so-separated crystals was $-19°$ C. and this product contained 97.7% by weight of 3-methylpyridine.

A mixture of 3-methylpyridine and 4-methylpyridine containing 95% of the former was chilled to $-30°$ C.; about 60% by weight of the so-treated mixture was separated from the mother liquor in a chilled centrifuge in one treating step. The crystalline product had a melting point of $-18.0°$ C.; it was pure 3-methylpyridine.

Example No. 4

A starting material containing about 20% of 3-methylpyridine and 80% of 4-methylpyridine was chilled to a temperature of −20.5 C., 54% by weight of the starting material was separated in a centrifuge as a crystalline product. This product was then melted and chilled to −2° C. until 32% by weight of the said starting material was separable therefrom in a centrifuge. Dehydration of this latter material to remove adsorbed water showed that it was 100% pure 4-methylpyridine having a melting point of +3.7° C.

In treating any of these mixtures of pyridine homologues at low temperatures for the recovering of enriched fractions or of pure products, there is marked tendency for the liquid mixture to supercool and representative equilibrium conditions are not easily established. In treating any mixture according to the invention, vigorous agitation is advantageous. If the employed mixtures are near their eutectic compositions, it is highly advantageous for the purity of the recovered product to seed the chilled solutions with preformed crystals of the compound to be prepared in enriched concentration or in pure form.

For determining the compositions of produced mixtures or of pure products, correlation of the melting points of their picrates with the picrates of known pure homologues of pyridine or mixtures thereof is a convenient control means; or by physico-chemical means such as determining the freezing points of mixtures of the unknown product with known pure compounds and correlating the results with the accompanying phase diagrams.

Toulene, methylcyclohexane, and various alcohols have been shown to be appropriate media for removing mother liquor adhering to the precipitated crystals.

The invention as hereinabove set forth is embodied in particular form and manner but may be variously embodied within the scope of the claims hereinafter made.

We claim:

1. A method of separating from a normally liquid mixture comprising at least two of the compounds, 2,6 - dimethylpyridine, 4 - methylpyridine, and 3 - methylpyridine and containing more of at least one compound than is required to form a eutectic mixture, a fraction that is enriched in respect of at least said one of said compounds, said method comprising the steps of: cooling said normally liquid mixture to a temperature below 0° C. but above −30° C. to −50° C. and thereby forming therein a solid phase wherein said one of said component compounds of said mixture is contained in higher proportionate homologue relation than it is contained in the original liquid mixture; and separating so-formed solid phase from the so-cooled mixture.

2. A method of separating from a normally liquid essentially binary mixture of two of the compounds, 2,6 - dimethylpyridine, 4 - methylpyridine, and 3-methylpyridine and containing more of at least one compound than is required to form a eutectic mixture, a fraction wherein said one compound of said binary mixture is in enriched concentration, said method comprising the steps of: cooling said binary mixture to a temperature below 0° C. but above −30° C. to −40° C. and thereby forming therein a solid phase wherein said one compound of said binary mixture is contained in higher proportionate homologue relation than it is contained in the original liquid mixture; and separating so-formed solid phase from the so-cooled mixture.

3. A method of separating from a normally liquid essentially binary mixture of two of the compounds, 2,6 - dimethylpyridine, 4 - methylpyridine, and 3-methylpyridine, a fraction wherein one compound of said binary mixture is in enriched concentration, the said mixture containing more of one compound than is required to form a eutectic with all of the other compound, said method comprising the steps of: cooling said binary mixture to a temperature that is between 0° C. and −40° C. and thereby forming in said binary mixture a solid phase containing that compound, which is in excess of the eutectic mixture, in enriched concentration; and separating so-formed solid phase from such so-cooled mixture.

4. A method of separating from a normally liquid mixture comprising a plurality of pyridine homologues having such closely adjacent boiling points that they are difficultly separable by distillation, a fraction that is enriched in respect of at least one of said homologues, said normally liquid mixture containing at least one of said homologues in amount in excess of that forming a eutectic mixture of said homologues, said method comprising the steps of: cooling said mixture to a temperature between 0° C. and −50° C. and thereby forming in said liquid mixture a solid phase wherein said one of said plurality of pyridine homologues is in higher proportionate homologue relation than it is contained in said liquid mixture; and separating so-formed solid phase from the so-cooled mixture.

5. A method of separating from a mixture of 3-methylpyridine and 4-methylpyridine, a fraction containing the former compound in at least 35 per cent concentration by weight, said method comprising the steps of: cooling a said mixture that contains more 3-methylpyridine than is necessary to form a eutectic with the 4-methylpyridine in said mixture, to a temperature below −18° C. but above −40° C. and thereby forming in said mixture a solid phase containing at least 85 per cent by weight of 3-methylpyridine; and separating so-formed solid phase from the so-cooled mixture.

6. A method of separating enriched fractions of 2,6-dimethylpyridine, 4-methylpyridine, and 3-methylpyridine from their essentially binary and their ternary liquid mixtures and of which at least one of said compounds is in excess of that forming a eutectic mixture, said method comprising the steps of: cooling a said mixture to a temperature below +3.7° C. but above −30° C. to −50° C. and thereby forming in such mixture a solid phase containing a said compound in excess in greater enrichment than it is contained in said mixture; and separating so-formed solid phase from such so-cooled mixture.

7. A method of separating from a normally liquid essentially binary mixture containing 4-methylpyridine and another homologue of pyridine having a thereto closely-adjacent boiling point, the mixture containing more 4-methylpyridine than is required to form a eutectic with all of said other homologue of pyridine, said method comprising the steps of: cooling a said mixture to a temperature below +3.7° C. but above −30° C. to −40° C. and thereby forming in such mixture a solid phase containing 4-methylpyridine in greater enrichment than it is contained in said mixture; and separating so-formed solid phase from such so-cooled mixture.

8. A method of separating from a normally liquid essentially binary mixture containing 2,6-dimethylpyridine and another homologue of pyridine having a thereto closely-adjacent boiling point, the mixture containing more 2,6-dimethylpyridine than is required to form a eutectic with all of said other homologue of pyridine, said method comprising the steps of: cooling a said mixture to a temperature below −6° C. but above −30° C. to −40° C. and thereby forming in such mixture a solid phase containing 2,6-dimethylpyridine in greater enrichment than it is contained in said mixture; and separating so-formed solid phase from such so-cooled mixture.

9. A method of separating from a normally liquid mixture comprising a plurality of pyridine homologues having such closely adjacent boiling points that they are difficultly separable by distillation, a fraction that is enriched in respect of at least one of said homologues, said normally liquid mixture containing at least one of said homologues in amount in excess of that forming a eutectic mixture of said homologues, said method comprising the steps of: cooling a said mixture to a temperature, between the depressed melting point of at least one of the pyridine homologues in excess of the eutectic of said liquid mixture and the eutectic point of the eutectic of the said mixture, and thereby forming in said liquid mixture a solid phase wherein at least one of said plurality of pyridine homologues is in higher proportionate homologue relation than it was originally contained in the original liquid mixture; and separating the resulting so-formed solid phase.

10. A method of separating from a normally liquid essentially binary mixture of two of the compounds, 2,6-dimethylpyridine, 4-methylpyridine, and 3-methylpyridine, and containing more of one of said two compounds than is required to form a eutectic mixture with the other thereof, a fraction enriched in respect of the one of the two compounds of said binary mixture that is present therein in amount more than that required to form a eutectic with the other compound, said method comprising the steps of: cooling said binary mixture to a temperature between the depressed melting point of said one compound and the eutectic point of the eutectic of the mixture and thereby forming in said liquid mixture a solid phase wherein said one compound is in higher proportionate homologue relation than it was when contained in the original liquid mixture; and separating the resultant so-formed solid phase.

WILLIAM LUDOMIER GLOWACKI.
CHARLES FRANCIS WINANS.